T863012

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JUNE 24, 1969

863 O.G. 1001

794,773

POLYESTERS AND POLYAMIDES PREPARED FROM DIESTER OR DIAMINE DERIVATIVES OF BISPHENOLS

Thomas M. Laakso and William F. Fowler, Jr., both % Kodak Park Works, Rochester, N.Y. 14650

Filed Jan. 28, 1969. Published June 24, 1969
Int. Cl. G03g *5/06, 7/00*
U.S. Cl. 96—1.5
No Drawing. 39 Pages Specification

A polymeric material is disclosed which contains recurring units of

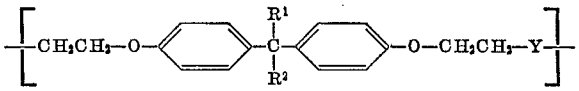

wherein Y can be a radical of the formula (a) $-\overset{O}{\overset{\|}{C}}-O-R^3-O-\overset{O}{\overset{\|}{C}}-$ or (b) $-CH_2-NH-\overset{O}{\overset{\|}{C}}-R^4-\overset{O}{\overset{\|}{C}}-NH-CH_2-$ and wherein $R^1$ can be hydrogen or a lower alkyl radical, $R^2$ can be a lower alkyl radical or a substituted or unsubstituted aryl radical including polycyclic aryl radicals, and $R^3$ and $R^4$ can be an alkylene radical, a dialkylene substituted cycloalkane radical, an arylene radical or a dialkylene substituted aryl radical.